(12) United States Patent
Ahrens et al.

(10) Patent No.: US 6,494,623 B1
(45) Date of Patent: Dec. 17, 2002

(54) RELEASE MECHANISM FOR PLUGGABLE FIBER OPTIC TRANSCEIVER

(75) Inventors: Michael E. Ahrens, Campbell, CA (US); Andreas H. Dannenberg, Cupertino, CA (US)

(73) Assignee: Infineon Technologies AG, Munich (DE)

( * ) Notice: Subject to any disclaimer, the term of this patent is extended or adjusted under 35 U.S.C. 154(b) by 0 days.

(21) Appl. No.: 09/927,278

(22) Filed: Aug. 9, 2001

(51) Int. Cl.[7] .................................................. G02B 6/36
(52) U.S. Cl. ........................................ 385/76; 439/372
(58) Field of Search ............................... 385/53, 56, 92, 385/76, 77, 58, 59; 439/76.1, 607–610, 567, 571, 572, 352, 372, 342; 361/754, 798, 801, 728, 755

(56) References Cited

U.S. PATENT DOCUMENTS

| | | | |
|---|---|---|---|
| 4,779,950 A | * 10/1988 | Williams | ...................... 385/58 |
| 5,546,281 A | 8/1996 | Poplawski et al. | |
| 5,717,533 A | 2/1998 | Poplawski et al. | |
| 5,734,558 A | 3/1998 | Poplawski et al. | |
| 5,864,468 A | 1/1999 | Poplawski et al. | |
| 5,879,173 A | 3/1999 | Poplawski et al. | |
| RE36,820 E | 8/2000 | McGinley et al. | |
| 6,178,096 B1 | * 1/2001 | Flickinger et al. | ..... 439/76.1 X |
| 6,186,670 B1 | * 2/2001 | Austin et al. | .................. 385/55 |
| 6,201,704 B1 | 3/2001 | Poplawski et al. | |
| 6,220,878 B1 | 4/2001 | Poplawski et al. | |
| 6,267,606 B1 | 7/2001 | Poplawski et al. | |
| 6,406,317 B1 | * 6/2002 | Li et al. | ...................... 439/342 |
| 6,422,763 B1 | * 7/2002 | Halbach et al. | ................ 385/77 |
| 6,430,053 B1 | * 8/2002 | Peterson et al. | ........ 439/352 X |
| 6,434,015 B1 | * 8/2002 | Hwang | .................. 439/76.1 X |

* cited by examiner

*Primary Examiner*—Brian Sircus
*Assistant Examiner*—Son V. Nguyen
(74) *Attorney, Agent, or Firm*—Stanton Braden

(57) ABSTRACT

A release mechanism for manually securing a pluggable fiber optic transceiver to a cage mounted on a host circuit board. The transceiver is secured to the cage by a boss extending from a lower wall of the transceiver housing that is received in an opening formed in a resilient transceiver latch of the cage. The release mechanism includes a locking mechanism including a shaft rotatably connected to the transceiver body, a lever extending from a front end of the transceiver body and connected to a first end of the shaft, and a cam mounted at a rear end of the shaft adjacent to the locking mechanism. When the lever is manually rotated, the cam pushes the transceiver latch away from the boss, thereby allowing the transceiver to be pulled from the cage by the lever.

20 Claims, 5 Drawing Sheets

RELEASE MECHANISM FOR PLUGGABLE FIBER OPTIC TRANSCEIVER

FIELD OF THE INVENTION

This invention relates to fiber optic (optoelectronic) communications, and more particularly to pluggable fiber optic transceivers utilized in fiber optic systems.

BACKGROUND OF THE INVENTION

Fiber optic transceivers facilitate bi-directional data transmissions between electronic devices (e.g., computer, input/output system, peripheral device, or switch) and optical data links in fiber optic (optoelectronic) systems. Each transceiver includes a photodetector for converting optically encoded data received from an optical data link to electrically encoded data readable by a host electronic device, and a laser diode for converting electrically encoded data signals from the host electronic device that are converted into optical signals and transmitted to the optical data link. Each transceiver is mounted onto a circuit card assembly of the host electronic device, and is therefore typically packaged such that it occupies as little circuit card surface area as possible.

Small Form-factor Pluggable (SFP) transceivers are one type of transceiver having standardized physical dimensions and performance characteristics that are defined in the "Cooperation Agreement for Small Form-Factor Pluggable Transceivers", as executed on Sep. 14, 2000 (herein "the Cooperation Agreement"), which is incorporated herein in its entirety. The Cooperation Agreement is part of an SFP Transceiver multi-source agreement whose purpose is to establish internationally compatible sources of pluggable fiber optic transceivers in support of established standards for fiber optic systems. Specifically, the Cooperation Agreement sets forth transceiver package dimensions, cage and electrical connector specifications, host circuit board layouts, electrical interface specifications, and front panel bezel requirements that are followed by each party.

FIG. 1 is a simplified exploded perspective view depicting a transceiver assembly 100 that complies with the Cooperation Agreement. Transceiver assembly 100 includes a host circuit board 130 upon which is mounted a standard female electrical connector 140, a pluggable transceiver 150, a cage 160, and an optional bezel 180 (shown in dashed lines) that is mounted over the front end of transceiver assembly 100.

Pluggable transceiver 150 includes transceiver electronics that are mounted in an elongated transceiver housing 151 that is designed for "pluggable" insertion into cage 160. Transceiver housing 151 includes an upper surface defining several vent holes, a lower surface including a boss 152 (shown in dashed lines), and a front surface defining pair of receptacles 153 for receiving standard optical connectors 190 (e.g., duplex LC, MT-RJ, or SC connectors). Mounted within housing 151 is a circuit board 154 for supporting the transceiver electronics, which process data signals from and supply data signals to a photodetector 155 and a laser diode 156, respectively. A pair of ferrules 157 is mounted in receptacles for aligning standard optical connectors (not shown) with photodetector 155 and laser diode 156. Extending from the back end of circuit board 154 is a male connector card 158 including contacts 159 that mate with corresponding contacts 144 of female connector 140 when cage 160 is mounted on host circuit board 130 and pluggable transceiver 150 is fully inserted into cage 160.

Referring to the center of FIG. 1, cage 160 includes a first side wall 161, a second side wall 162, a top wall 163, and a bottom wall 164 that collectively define a front opening 165 for receiving pluggable transceiver 150. Cage 160 also includes a back wall 166, which includes a leaf spring for biasing transceiver 150 toward opening 165. Extending downward from side walls 161 and 162 and back wall 166 are feet 167 that are press fitted into holes 135 formed in host circuit board 130. Note that holes 135 are plated with a conductive material 136 to provide a ground connection between cage 160 and host circuit board 130. Bottom wall 164 and back wall 166 define an opening for receiving female connector 140 when cage 160 is press fitted onto host circuit board 130. A series of resilient clips 168 are formed by folding elongated tabs extending from walls 161, 162, 163, and 164, and are utilized to provide electrical connection between cage 160 and optional bezel 180. Formed on bottom wall 164 of cage 160 is a transceiver latch 170 that defines a latch opening 175 for receiving boss 152 provided on the lower surface of transceiver housing 151 to secure transceiver 150 inside cage 100. A series of vent holes are formed on top wall 163 that align with vent holes formed in transceiver housing 151 (discussed above), and cooperate with an optional system ventilation (cooling) system to maintain transceiver 150 at a desired operating temperature. Cage 160 includes dimensions that are consistent with the standards set forth in the Cooperation Agreement, and is discussed in further detail in co-pending U.S. Patent application Ser. No. 09/810,820-6776, entitled "SINGLE-PIECE CAGE FOR PLUGGABLE FIBER OPTIC TRANSCEIVER", which is incorporated herein by reference.

FIGS. 2(A) through 2(D) are simplified partial side views depicting the attachment and subsequent removal of transceiver 150 to/from cage 160. As indicated in FIGS. 2(A), 2(B) and 2(C), as transceiver 150 is pushed into cage 160 (i.e., between upper wall 163 and lower wall 164 in the direction indicated by arrow A), transceiver latch 170 is pushed downward (i.e., bent away from transceiver housing 151 in the direction indicated by arrow B) by boss 152 until boss 152 enters latch opening 175, at which point transceiver latch 170 is resiliently biased upward (i.e., in the direction indicated by arrow C; see FIG. 2(C)). In this latched state, movement of transceiver 150 out of cage 100 (i.e., in the direction of arrow D in FIG. 2(C)) is prevented by the contact between boss 152 and the inner edge of latch opening 175. As shown in FIG. 2(D), subsequent manipulation of latch 170 (e.g., by a manual force F) releases boss 152 from latch opening 175, thereby allowing removal of transceiver 150. Ideally, the spring provided on back wall 166 of cage 160 pushes transceiver 150 forward (i.e., in the direction of arrow D) when latch 170 is manipulated as shown in FIG. 2(D).

A problem associated with the conventional transceiver latching mechanism depicted in FIGS. 2(A) through 2(D) is that in highly populated arrangements (i.e., in which many transceiver assemblies are mounted in close proximity), it is often very difficult to manipulate transceiver latch 170, thereby making it difficult to remove transceiver 150 from cage 160.

FIG. 3 is a simplified side view showing a "belly-to-belly" configuration in which two transceiver assemblies 100-1 and 100-2 are mounted on opposite sides of host circuit board 130. Specifically, a first cage 160-1 is mounted on an upper side of host circuit board 130 into which a first transceiver 150-1 is inserted, and a second cage 160-2 is mounted on a lower side of host circuit board 130 into which a second transceiver 150-2 is inserted. Such a "belly-to-belly" arrangement is utilized to facilitate highly populated circuit boards that minimize space requirements. A problem with this and other highly populated transceiver arrangements is that they make accessing and manipulating transceiver latches (e.g., transceiver latches 170-1 and 170-2; see FIG. 3) very difficult, thereby increasing maintenance costs. Further, manipulation of conventional transceiver latches is not reliable and confusing.

What is needed is a release mechanism for pluggable fiber optic transceivers that is easy to access in highly populated transceiver arrangements, and is both reliable and intuitive.

SUMMARY OF THE INVENTION

The present invention is directed to a release mechanism for pluggable fiber optic transceivers including an intuitive, reliable and easily manipulated key-like locking member that is easily accessed for locking, unlocking, and removing a host transceivers from an associated transceiver cage.

In accordance with a first embodiment, the locking member includes a lever that extends from a front end of the transceiver housing. When the transceiver is unlocked, the lever is in a vertical position that blocks the transceiver receptacles, thereby intuitively notifying a user of the unlocked condition by blocking the insertion of fiber optic connectors. Conversely, when the transceiver is locked, the lever is rotated into a horizontal position and below the transceiver receptacles, thereby allowing insertion of a fiber optic connector. Accordingly, the lever intuitively notifies a user when a transceiver is locked and unlocked. Further, because the lever is actuated like a key, a user intuitively pulls on the lever when the lever is in the unlocked position, thereby facilitating a convenient and intuitive mechanism for removing transceivers from associated cages. Moreover, the levers are do not interfere with each other in belly-to-belly highly populated transceiver assemblies by rotating in opposite directions.

In accordance with an aspect of the present invention, the release mechanism includes a cam positioned in a recess formed in a bottom wall of the transceiver housing adjacent to the latch boss. When the lever is rotated into the unlocked position, the cam extends out of the recess and pushes the transceiver latch of a host cage away from the boss, thereby reliably facilitating removal of the transceiver. Conversely, when the lever is rotated into the locked position, the cam is rotated into the recess, thereby allowing the transceiver latch to move toward the bottom wall of the transceiver housing such that the boss engages the latch opening formed in the transceiver latch to reliably secure the transceiver in the cage.

In accordance with yet another aspect of the present invention, the locking member further includes a shaft that is rotatably coupled to the transceiver housing to transmit torsion from the lever to the cam. In one embodiment, the release mechanism includes a snap-coupling structure provided on the bottom wall of the transceiver housing for receiving the shaft to facilitate low cost assembly. In addition, the shaft includes one or more self-alignment rings that maintain the release mechanism in a proper position on the transceiver housing.

BRIEF DESCRIPTION OF THE DRAWINGS

These and other features, aspects and advantages of the present invention will become better understood with regard to the following description, appended claims, and accompanying drawings, where:

DETAILED DESCRIPTION OF THE DRAWINGS

Figure 1:
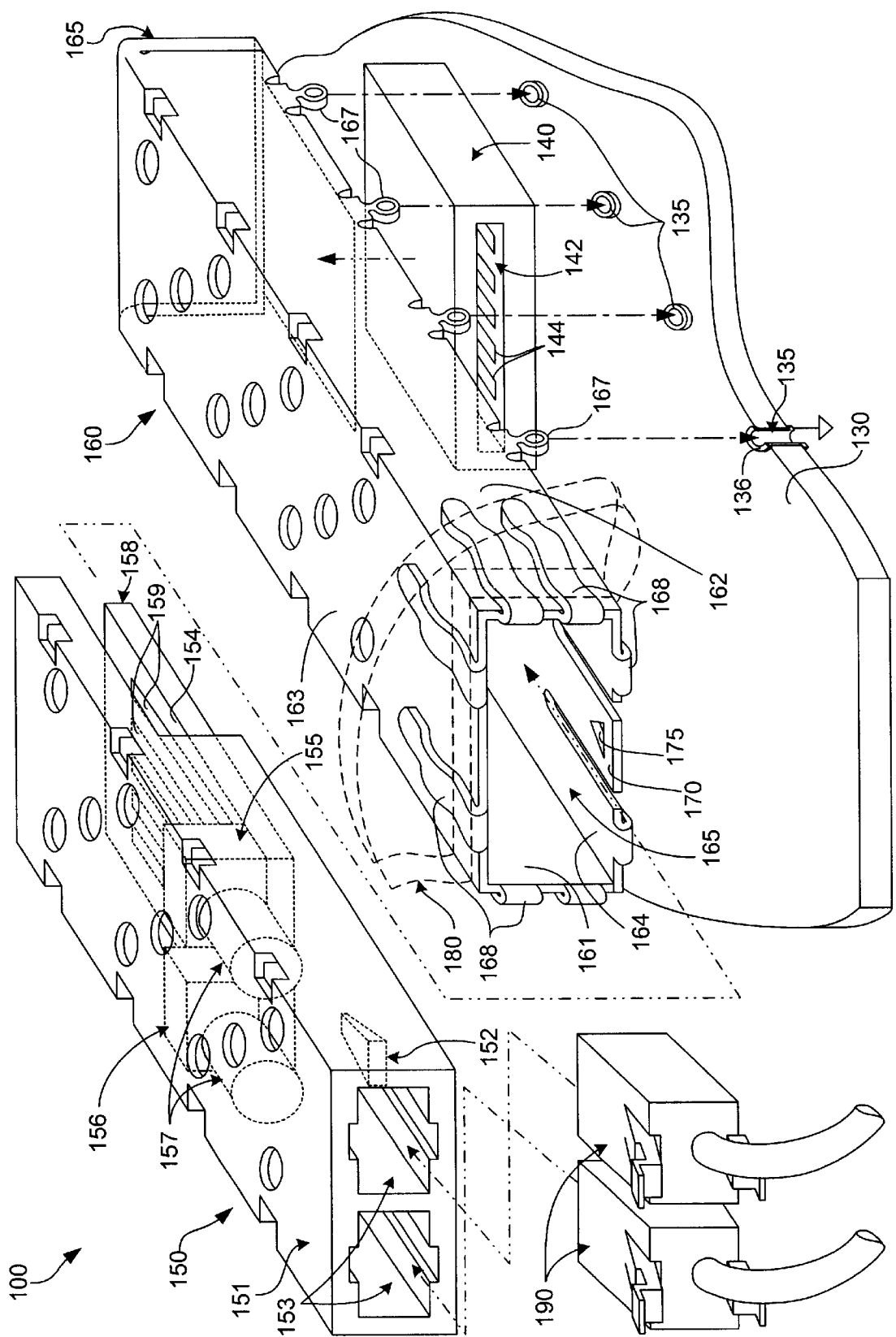
FIG. 1 is an exploded perspective view showing a conventional transceiver assembly.
Figure 2A:
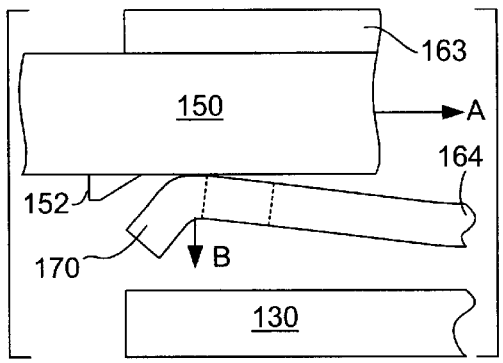
FIGS. 2(A), 2(B), 2(C), and 2(D) are simplified partial side views showing a latching mechanism of a conventional transceiver.
Figure 2B:
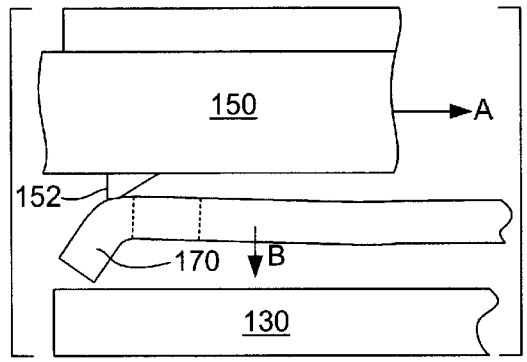
Figure 2C:
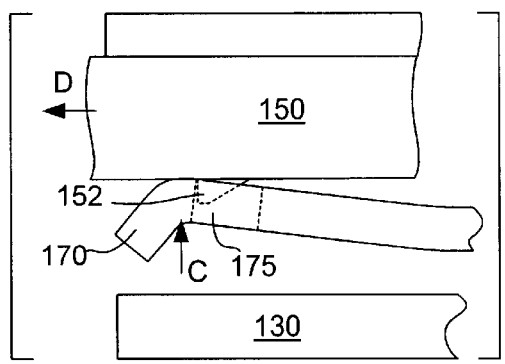
Figure 2D:
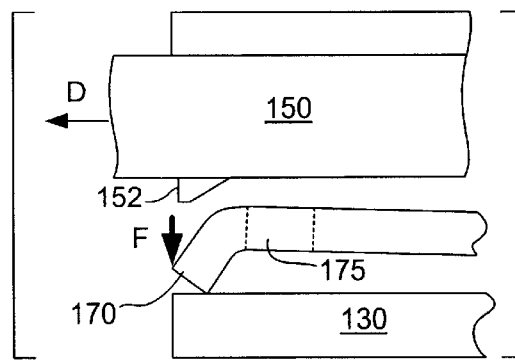
Figure 3:
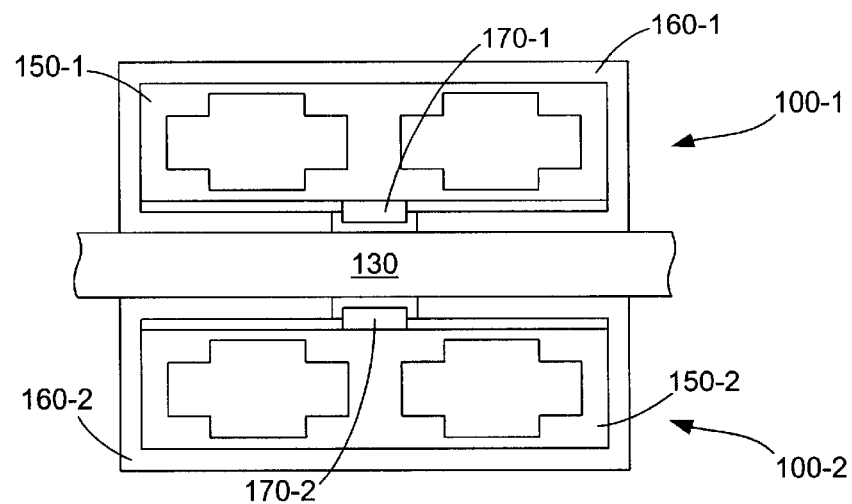
FIG. 3 is a front view showing two conventional transceivers in a belly-to-belly arrangement.
Figure 4A:
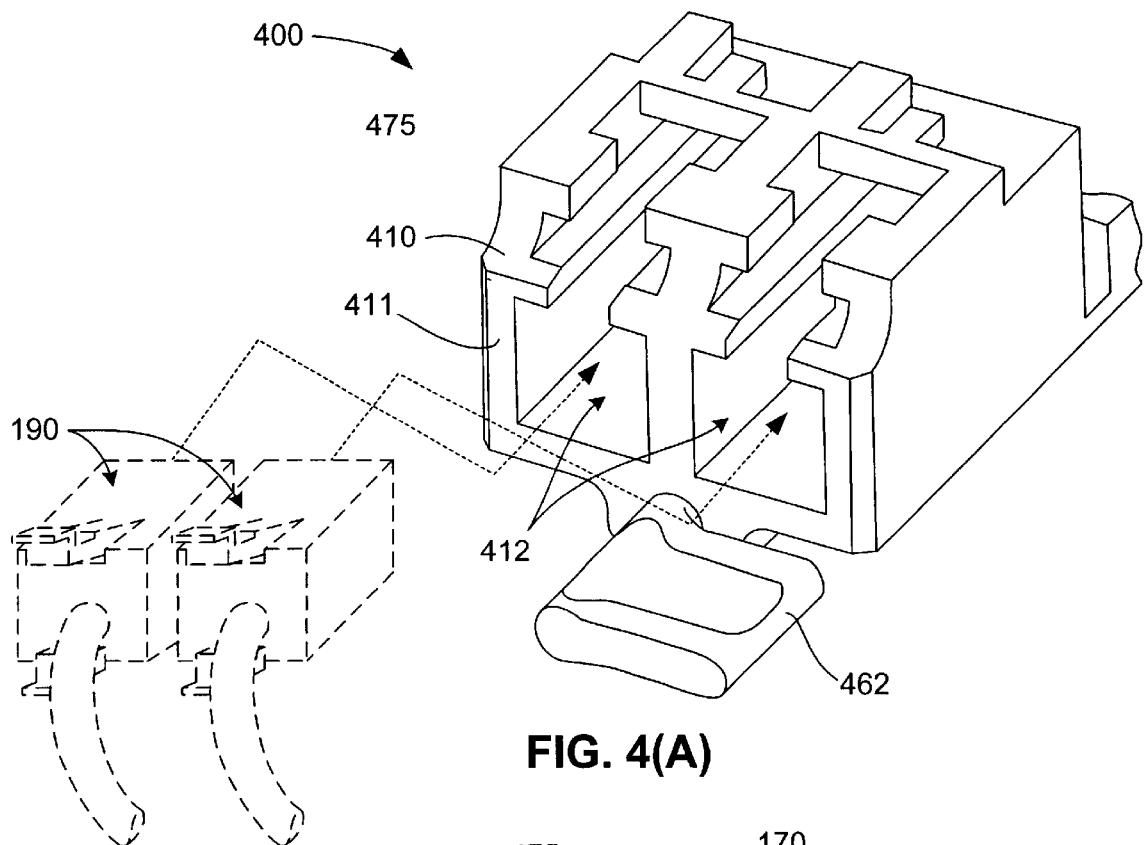
FIGS. 4(A) and 4(B) are partial perspective views showing a transceiver including a release mechanism according to the present invention.
Figure 4B:
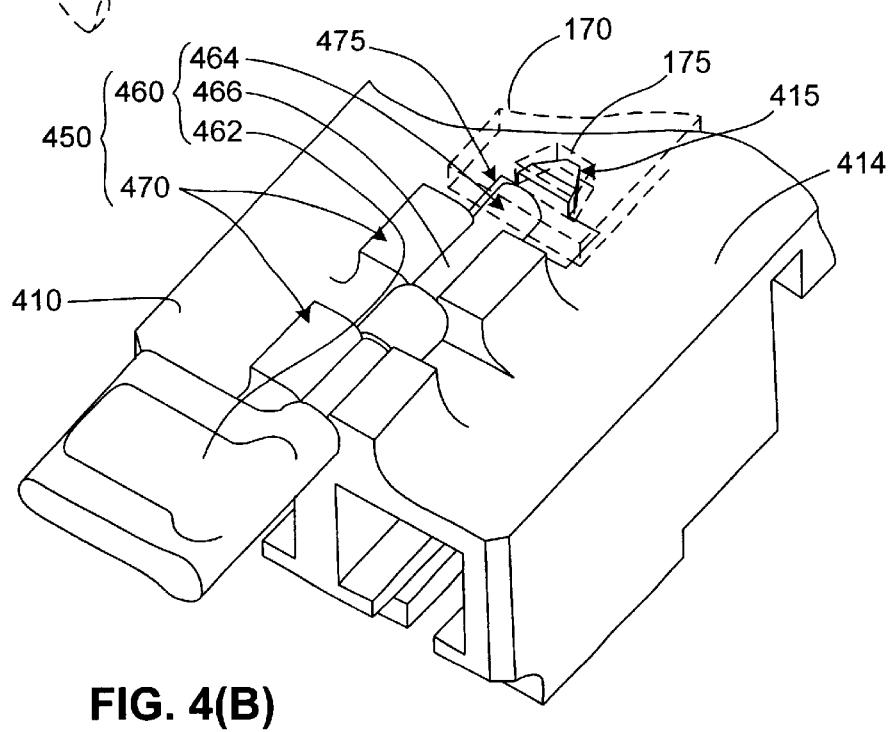

FIGS. 4(A) and 4(B) are partial top and bottom perspective views, respectively, showing a pluggable transceiver 400 according to an embodiment of the present invention. Pluggable transceiver 400 generally includes a housing 410 and a release mechanism 450 for manually securing housing 410 to and removing housing 410 from a host cage (not shown).

As indicated in FIG. 4(A), housing 410 includes a front wall 411 defining a pair of receptacles 412 that are provided for receiving standard fiber optic connectors 190 (described above). As shown in FIG. 4(B), housing 410 also includes a lower wall 414 having a boss 415 extending therefrom for securing housing 410 to a standard transceiver latch 170 (also described above). Omitted for brevity from FIGS. 4(A) and 4(B) are rear sections of housing 410 that include transceiver electronics similar to those described above with reference to conventional transceiver 150.

In accordance with the present invention, release mechanism 450 includes a locking member 460 that is rotatably connected to housing 410 and includes a lever 462 extending from front wall 411 of housing 410 that provides both a convenient and intuitive apparatus for securing housing 410 to transceiver latch 170. In the disclosed embodiment, locking member 460 also includes a cam (engaging portion) 464, a shaft 466 fixedly connected between lever 462 and cam 464, and a snap-coupling structure 470 integrally formed on lower wall 414 of housing 410. In an alternative embodiment, lever 462 may be connected to another engaging portion (e.g., a see-saw type mechanism) utilizing another force transfer structure (e.g., gears or cam-follower arrangement) that would translate the rotation of lever 462 into actuation of transceiver latch 170 (shown in FIG. 4(A)).

Figure 5A:
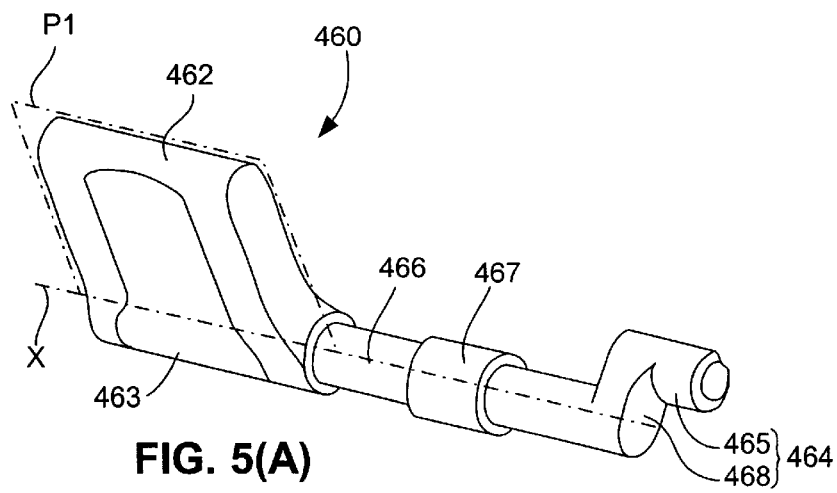
FIGS. 5(A) and 5(B) are alternative perspective views showing a locking member of the release mechanism.
Figure 5B:
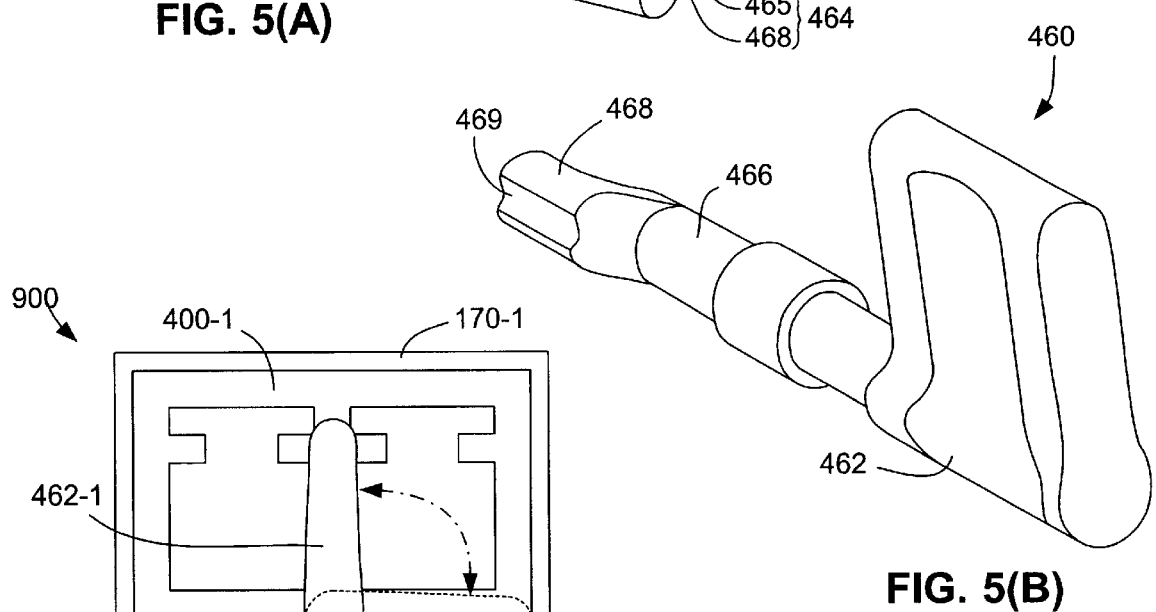

FIGS. 5(A) and 5(B) are alternative perspective views showing locking member 460 in additional detail. Lever 462 includes a substantially flat, rectangular body defining a plane P1, and is connected along an edge 463 to a first end of shaft 466 (i.e., edge 463 is aligned with a longitudinal axis of rotation X defined by shaft 466). Optional depressions are provided in the side surfaces of lever 462 to facilitate manipulation by a user's fingers. Shaft 466 is a cylindrical member that includes an optional self-alignment ring 467 for preventing movement of locking member 460 along axis X relative to housing 411 (discussed further below). Cam 464 is connected to a second end of shaft 466, and includes a contact (cam) structure 465 that is offset from axis X by an arm 468. As shown in FIG. 5(B), contact structure 465 is provided with an optional clearance groove that provides clearance for inserting a fiber optic connector. In one embodiment, locking member 460 is molded from a suitably rigid and durable plastic, such as polycarbonate including 5–30% by weight of glass, or a similar glass-filled material.

Figure 6A:
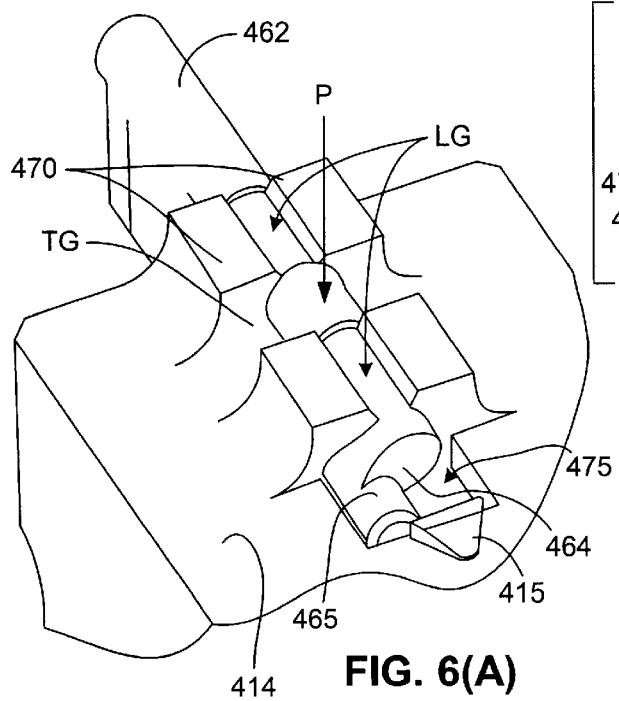
FIGS. 6(A) and 6(B) respectively show locking member 460 in an unlocked (first) position and a locked (second) position, respectively.

Referring to FIG. 6(A), locking member 460 is assembled (coupled) onto housing 410 by positioning shaft 466 over a longitudinal gap LG defined by snap-coupling structure 470 such that lever 464 extends in front of front wall 411 and cam 464 is positioned over a recess 416 defined in lower wall 414. In the disclosed embodiment, self-alignment ring 467 is positioned over a transverse gap TG also defined by snap-coupling structure 470. In alternative embodiments, transverse gap TG may be eliminated and two self-alignment rings may be provided at each end of snap-coupling structure 470. With locking member 460 positioned as described above, assembly is completed by pressing locking member 460 in the direction indicated by arrow P.

Figure 6B:
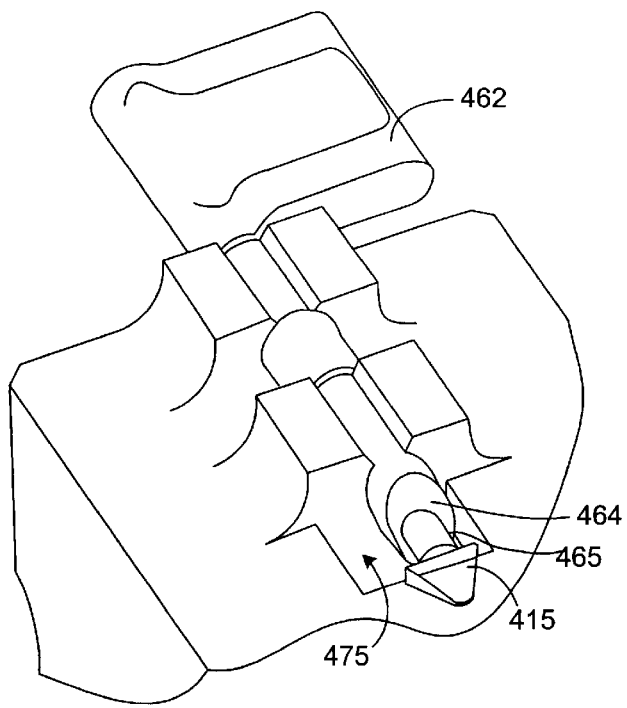
Figure 7A:
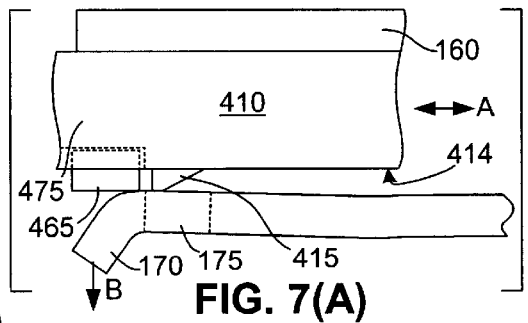
FIGS. 7(A) and 7(B) are simplified side and front views, respectively, showing portions of the locking member in the unlocked position of FIG. 6(A)
Figure 7B:
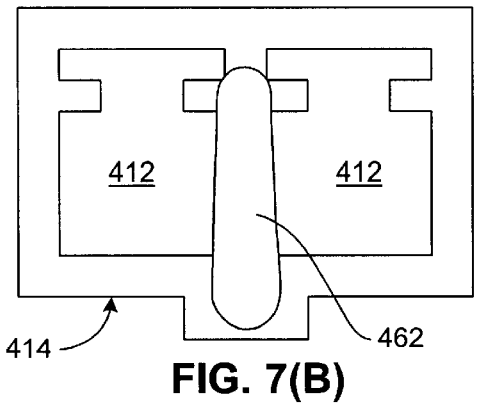

FIGS. 6(A) and 6(B) respectively show locking member 460 in an unlocked (first) position and a locked (second) position, respectively. FIGS. 7(A) and 7(B) are simplified side and front views, respectively, showing portions of the locking member in the unlocked position of FIG. 6(A), and FIGS. 8(A) and 8(B) are simplified side and front views, respectively, showing portions of the locking member in the unlocked position of FIG. 6(A).

Referring to FIG. 6(A), in the unlocked position, cam 464 is rotated such that contact surface 465 is located in a relatively shallow portion of recess 475 such that, as shown in FIG. 7(A), a portion of contact surface 465 extends out of recess 475 (i.e., out of the plane defined by lower wall 414) such that cam 464 pushes transceiver latch 170 away from lower wall 414 of housing 410 (i.e., in the direction of arrow B). In the unlocked position, transceiver latch 170 is biased such that boss 415 is disengaged from latch opening 175, thereby allowing insertion and removal of housing 410 from a host transceiver cage 160 (i.e., in the direction indicated by arrow A). In addition, as shown in FIG. 7(B), when the locking member is rotated into the unlocked position, lever 462 that is perpendicular to the plane defined by lower wall 414, thereby partially blocking receptacles 412 such that fiber optic connectors (not shown) cannot be inserted therein. Accordingly, a user is intuitively notified that the transceiver is not locked because lever 462 prevents the insertion of fiber optic connectors when the locking member is in the unlocked position.

Figure 9:
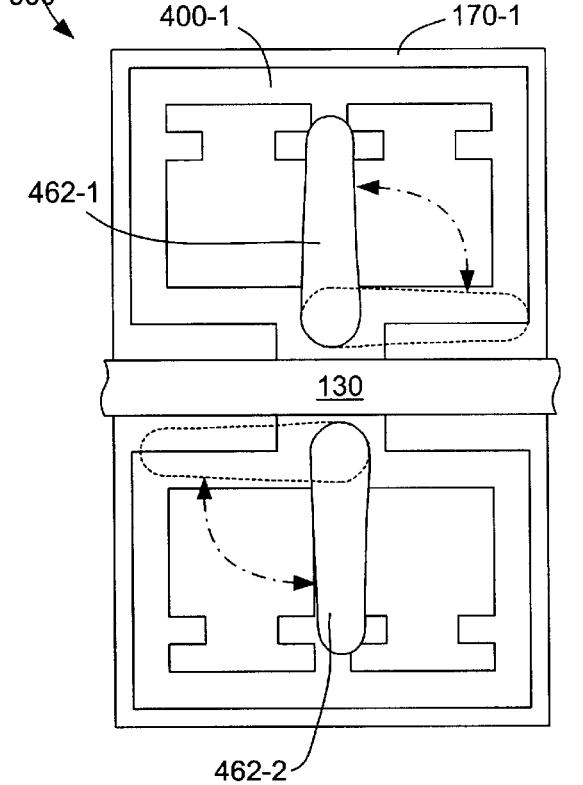
FIG. 9 is a simplified front view showing two transceivers including the release mechanisms of the present invention in a belly-to-belly arrangement.
Figure 8A:
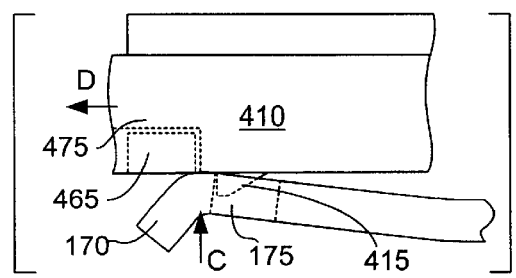
FIGS. 8(A) and 8(B) are simplified side and front views, respectively, showing portions of the locking member in the unlocked position of FIG. 6(A)
Figure 8B:
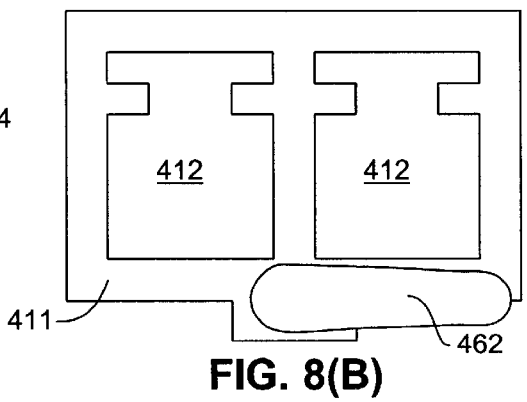

Referring to FIG. 6(B), in the unlocked position, cam 464 is rotated such that contact surface 465 is located in a second, relatively deep portion of recess 475 such that, as shown in FIG. 8(A), a contact surface 465 is fully retracted into recess 475 (i.e., below of the plane defined by lower wall 414) such the resilient transceiver latch 170 is biased toward lower wall 414 of housing 410 (i.e., in the direction of arrow C). In the locked position, transceiver latch 170 is biased such that boss 415 is engaged in latch opening 175, thereby preventing removal of housing 410 from a host transceiver cage 160 (i.e., in the direction indicated by arrow D). In addition, as shown in FIG. 8(B), when the locking member is rotated into the locked position, lever 462 is parallel to the plane defined by lower wall 414, thereby allowing the insertion of fiber optic connectors into and the removal of fiber optic connectors from receptacles 412. Accordingly, a user is intuitively notified that the transceiver is locked. 331 FIG. 9 is a simplified front view showing a "belly-to-belly" configuration 900 in which two transceivers 400-1 and 400-2 are mounted in associated cages 160-1 and 160-2 on opposite sides of host circuit board 130. Specifically, a first cage 160-1 is mounted on an upper side of host circuit board 130 into which a first transceiver 400-1 is inserted, and second cage 160-2 is mounted on a lower side of host circuit board 130 into which second transceiver 400-2 is inserted. Transceiver 400-1 and 400-2 include levers 462-1 and 462-2 that extend from front walls, respectively, and are rotated between locked an unlocked positions as indicated. Note that because levers 462-1 and 462-2 rotate in opposite directions, lever 462-1 does not interfere with the rotation of lever 462-2, and lever 462-2 does not interfere with the rotation of lever 462-1. Accordingly, the release mechanism of the present invention is particularly useful in highly populated transceiver assemblies, such as the belly-to-belly configuration 900 shown in FIG. 9.

Although the present invention has been described with respect to certain specific embodiments, it will be clear to those skilled in the art that the inventive features of the present invention are applicable to other embodiments as well, all of which are intended to fall within the scope of the present invention.

What is claimed is:

1. A pluggable transceiver comprising:
   a housing having a front wall defining a receptacle for receiving a fiber optic connector; and
   a release mechanism including a locking member rotatably connected to the housing, the locking member including a lever extending from the front wall of the housing, and an engaging portion fixedly connected to the lever,
   wherein the locking member is arranged such that when the lever is rotated into a first position, the lever blocks at least a portion of the receptacle to prevent insertion of the fiber optic connector and the engaging portion is in an unlocked position, and when the lever is rotated into a second position, the fiber optic connector is freely insertable into the receptacle and the locking member is in a locked position.

2. The pluggable transceiver according to claim 1, wherein the engaging portion comprises a cam, and wherein the locking member further comprises a shaft fixedly connected between the lever and the cam.

3. The pluggable transceiver according to claim 2, wherein the housing includes a lower wall, and the release mechanism further comprises a snap-coupling structure formed on the lower wall for securing the shaft to the housing, wherein the lower wall further defines a recess for receiving the cam,
   wherein a contact structure of the cam extends from the lower wall of the housing when the engaging member is in the locked position, and the contact structure is retracted into the recess when the engaging member is in the unlocked position.

4. The pluggable transceiver according to claim 2, wherein the lever comprises a flat body defining a plane that is connected along one edge to the shaft.

5. A pluggable transceiver comprising:
   a housing having a front wall defining a receptacle for receiving a fiber optic connector, and a lower wall defining a recess; and a release mechanism including:
    a lever rotatably mounted on the housing and extending from the front wall, and
    a cam connected to the lever and mounted in the recess,
wherein the lever and cam are arranged such that manual rotation of the lever from a first position to a second position causes a contact structure of the cam to protrude from the lower wall of the housing, and rotation of the lever from the second position to the first position causes the contact structure to retract into the recess.

6. The pluggable transceiver according to claim 5, wherein the lever includes a flat body that is perpendicular to the lower wall when the lever is in the first position, and that is parallel to the lower wall when the lever is in the second position.

7. The pluggable transceiver according to claim 5, wherein the release mechanism further comprises a shaft connected between the lever and the cam.

8. The pluggable transceiver according to claim 7, wherein the release mechanism further comprises a snap-coupling structure formed on the lower wall of the housing for rotatably securing the shaft to the housing.

9. The pluggable transceiver according to claim 8, wherein the shaft includes self-alignment ring that contacts the snap-coupling structure to prevent movement of the release mechanism along an axis defined by the shaft relative to the housing.

10. The pluggable transceiver according to claim 7, wherein the cam includes an arm fixedly connected to an end of the shaft, wherein the contact structure is mounted on an end of the arm.

11. The pluggable transceiver according to claim 10, wherein the curved cam structure defines a clearance groove.

12. A pluggable transceiver comprising:
    a housing having a front wall defining a receptacle for receiving a fiber optic connector, and a lower wall including a snap-coupling structure; and
    a locking member including:
        a shaft rotatably coupled to the snap-coupling structure,
        a lever connected to a first end of the shaft and extending from the front wall of the housing, and
        an engaging portion connected to a second end of the shaft,
    wherein rotation of the lever into a first position is transmitted by the shaft to rotate the engaging portion into an unlocked position, and rotation of the lever into a second position is transmitted by the shaft to rotate the engaging portion into a locked position.

13. The pluggable transceiver according to claim 12, wherein the lever comprises a flat body having an edge that is aligned with an axis defined by the shaft.

14. The pluggable transceiver according to claim 13, wherein when the lever is rotated into the first position, a plane defined by the flat body is perpendicular to a plane defined by the bottom surface of the housing, and when the lever is rotated into the second position, the plane defined by the flat body is parallel to a plane defined by the bottom surface of the housing.

15. The pluggable transceiver according to claim 12, wherein the engaging portion comprises a cam fixedly mounted on the shaft.

16. A transceiver assembly comprising:
    a cage defining a front opening and including a lower wall having a resilient transceiver latch; and
    a pluggable transceiver removably insertable into the front opening of the cage, the pluggable transceiver including:
        a housing having a front wall defining a receptacle for receiving a fiber optic connector, and a lower wall including a boss positioned to engage the transceiver latch when the pluggable transceiver is fully inserted into the cage, and
        a release mechanism including a locking member rotatably connected to the housing, the locking member including a lever extending from the front wall of the housing, and an engaging portion fixedly connected to the lever,
    wherein the locking member is arranged such that manual rotation of the lever from a first position to a second position causes the engaging portion to push the transceiver latch away from the lower wall of the housing, thereby disengaging the boss from the transceiver latch, and rotation of the lever from the second position to the first position causes the engaging portion to move away from the transceiver latch, thereby causing the transceiver latch to engage the boss.

17. The transceiver assembly according to claim 16, wherein the engaging portion comprises a cam, and wherein the locking member further comprises a shaft fixedly connected between the lever and the cam.

18. The transceiver assembly according to claim 17, wherein the release mechanism further comprises including a snap-coupling structure formed on the lower wall of the housing for securing the shaft to the housing, wherein the lower wall defines a recess for receiving the cam, and wherein the cam extends from the lower wall of the housing when the engaging member is in the locked position, and the cam is retracted into the recess when the engaging member is in the unlocked position.

19. The transceiver assembly according to claim 17, wherein the lever comprises a flat body defining a plane that is connected along one edge to the shaft.

20. The transceiver assembly according to claim 19, wherein the locking mechanism is arranged such that when the lever is rotated into the first position, the flat body blocks at least a portion of the receptacle to prevent insertion of the fiber optic connector, and when the lever is rotated into the second position, the flat body is rotated downward such that the fiber optic connector is freely insertable into the receptacle.

* * * * *

UNITED STATES PATENT AND TRADEMARK OFFICE
CERTIFICATE OF CORRECTION

PATENT NO.   : 6,494,623 B2
DATED        : December 17, 2002
INVENTOR(S)  : Ahrens et al.

It is certified that error appears in the above-identified patent and that said Letters Patent is hereby corrected as shown below:

<u>Title page,</u>
Item [75], Inventors, add the name -- Andreas Stockhaus, Berlin, (DE) --

Signed and Sealed this

Nineteenth Day of July, 2005

JON W. DUDAS
*Director of the United States Patent and Trademark Office*